United States Patent [19]
Motai

[11] Patent Number: 5,850,220
[45] Date of Patent: Dec. 15, 1998

[54] IMAGE DISPLAY APPARATUS AND A RECORDING MEDIUM DISPLAYING A MESSAGE AS A SCREEN SAVER

[75] Inventor: Goro Motai, Tokyo, Japan

[73] Assignee: Dai Nippon Printing Co., Ltd., Tokyo, Japan

[21] Appl. No.: 721,028

[22] Filed: Sep. 26, 1996

[30] Foreign Application Priority Data

Sep. 29, 1995 [JP] Japan ................................. 7-252592

[51] Int. Cl.$^6$ ........................................................ G06F 3/00
[52] U.S. Cl. ........................................................ 345/339
[58] Field of Search .................................. 345/473, 339, 345/333, 334, 963

[56] References Cited

U.S. PATENT DOCUMENTS 5,680,535 10/1997 Harbin et al. ........................... 345/473

FOREIGN PATENT DOCUMENTS 0 733 983 9/1996 European Pat. Off. .

OTHER PUBLICATIONS

Trivette, D., "What Comes After Dark? Microsoft Scenes", PC Magazine, v12, n19, p. 52(1), 1993.
Boling, D., "Changers Livens up Your Desktop," PC Magazine, v17, n2, p. 243(4). 1998.
"Operating Environments," PC Magazine, v14, n16 p. 295(2), 1995.
"Berkeley Systems Announces Digital Pet, . . . " Business Wire 5 Jan. 1996, pp. 01050072.
"MicroSeconds unveils the first in the series of Easy development kits: . . . " Business Wire, 20 Jan. 1997.
"This week in Multimedia software," Multimedia week, 24 Oct. 1994 v. 3, n. 42.
"Energy Bunny Software Program Threatened by Patent Apr. 6, 1994," Newbbytes News Week, 6 Apr. 1994.
"Put your calendar on the desktop," Macworld, Sep. 1994, p. 151.
Software: "DarkSide of the Macintosh", 2 pgs., 1990–1994, Tom Dowdy.
Software: "CONTROL.EXE" Control Panel Module of Windows 3.11, 2 pgs.
Software: "H.R. Giger Screen Saver", May 1995, Cyberdreams, Inc., 1 pg.

*Primary Examiner*—A. Katbab
*Attorney, Agent, or Firm*—Oblon, Spivak, McClelland, Maier & Neustadt, P.C.

[57] ABSTRACT

An image display apparatus is disclosed in which a graphic image of, for example, the earth, a message, and a calendar are displayed on a display unit. This image display apparatus is practical and prevents an operator from losing his/her interest in looking at the display.

4 Claims, 8 Drawing Sheets

| DATE DATA | MESSAGE |
|---|---|
| JAN.1 | ○○○ ..........<br>X X X .......... |
| ⋮ | ⋮ |
| FEB.11 | "GENIUS IS ONE PERCENT INSPIRATION AND NINETY-NINE PERCENT PERSPIRATION."<br>　　　　　THOMAS EDISON<br>HAPPY BIRTHDAY<br>　　　　　MARI YAMAZAKI |
| XXXX | "THE GOVERNMENT OF THE PEOPLE, BY THE PEOPLE AND FOR THE PEOPLE, SHALL NOT PERISH FROM THE EARTH."<br>　　　　　ABRAHAM LINCOLN |
| DEC.31 | ○○○ ..........<br>X X X .......... |

*FIG. 3*

IMAGE DISPLAY APPARATUS AND A RECORDING MEDIUM DISPLAYING A MESSAGE AS A SCREEN SAVER

BACKGROUND OF THE INVENTION

1. Field of the Invention

The present invention relates to an image display apparatus capable of preventing burning of the display unit and to a recording medium used for such an image display apparatus.

2. Description of the Related Art

In a personal computer or the like, software called "screen saver" is generally used so as to prevent burning of the display unit. That is, when the same image is fixedly displayed on the display unit for a prolonged period of time, the display unit tends to have a problem of burning. Therefore, the screen saver is operated so as to display, for example, a scene in which petals are falling, thereby preventing the same image from being displayed for a prolonged period of time. In this way, burning of the display unit is prevented. When a predetermined key is depressed while the screen saver is being operated, a menu screen is displayed. When a predetermined input operation is performed on the menu screen, a desired program (e.g., a spreadsheet program) is started.

The conventional screen saver only displays a scene in which petals are falling or displays an image such as a landscape while changing the position of the image with elapse of time. Therefore, an operator loses interest in looking at the display.

SUMMARY OF THE INVENTION

The present invention was achieved in view of the foregoing problems, and an object of the present invention is to provide an image display apparatus which is practical and which can maintain an operator's interest.

In order to achieve the above object, the present invention provides an image display apparatus which displays an image on a screen while changing the position of the image with elapse of time, thereby preventing burning of the display unit, wherein a calendar is displayed such that the calendar changes with elapse of time.

In the present invention, the image and the calendar are changed with elapse of time. This means that the display position and size of the image and/or the calendar, for example, is changed with elapse of time, or that the image and/or the calendar is repeatedly displayed and erased. Moreover, messages which changes with elapse of time are displayed. The messages include preset messages and messages which are arbitrarily created by an operator.

BRIEF DESCRIPTION OF THE DRAWINGS

FIG. 3 is a diagram showing the contents of message data;

DESCRIPTION OF THE PREFERRED EMBODIMENTS

Embodiments of the present invention will now be described with reference to the drawings.

Figure 1:
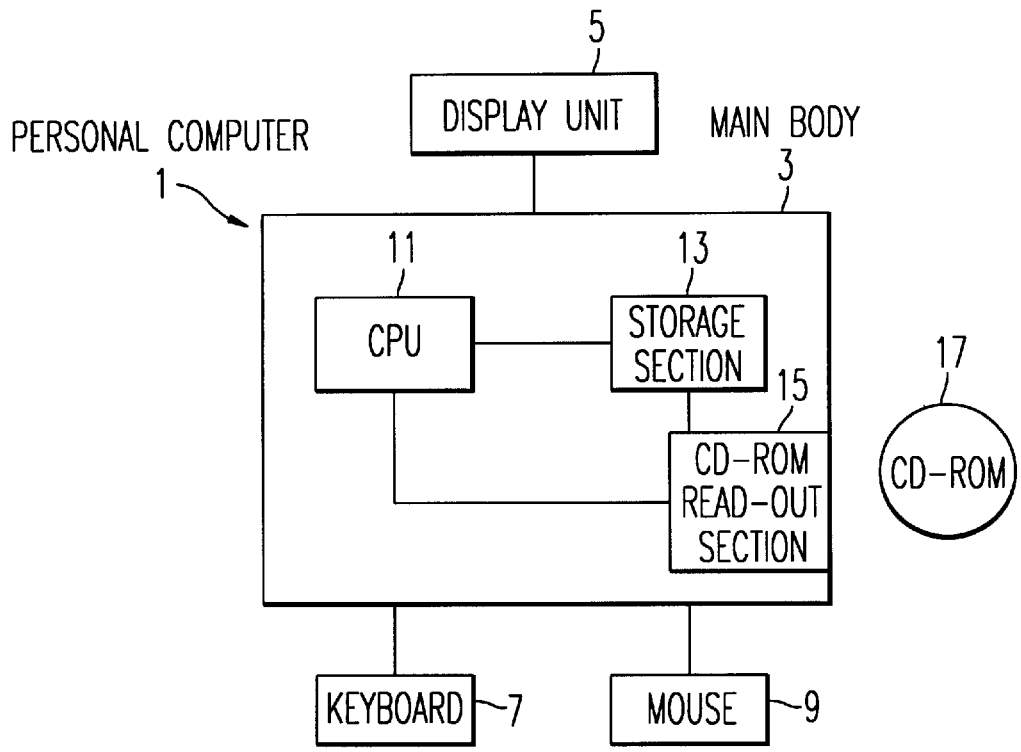
FIG. 1 is a block diagram schematically showing the structure of a personal computer, which is an image display apparatus according to a first embodiment of the present invention.

FIG. 1 is a block diagram schematically showing the structure of a personal computer 1, which is an image display apparatus according to a first embodiment of the present invention. The personal computer 1 has a main body 3, a display unit 5, a keyboard 7, and a mouse 9. The main body 3 includes a CPU 11, a storage section 13, and a CD-ROM read-out section 15. An unillustrated printer and other peripheral devices are also connected to the main body 3.

The CPU 11 carries out various kinds of calculation. The storage section 13 is composed of a hard disk apparatus which stores therein programs and the like. The CD-ROM read-out section 15 reads out the contents of a CD-ROM 17 in a state in which the CD-ROM 17 is inserted into the main body 3. The contents read out by the CD-ROM read-out section 15 are stored in the storage section 13. On the CD-ROM 17 serving as a recording medium is recorded a screen saver program. In general, the screen saver program recorded on the CD-ROM 17 is used after being installed into the storage section (hard disk apparatus) 13.

Next, the operation of the present embodiment will be described. In the screen saver according to the present embodiment, not only an ordinary image but also a calendar and messages are displayed while the manner of display is changed with elapse of time. The displayed messages include messages which are arbitrarily created by an operator (user) of the personal computer 1, as well as messages which have been previously recorded on the CD-ROM 17.

Figure 2:
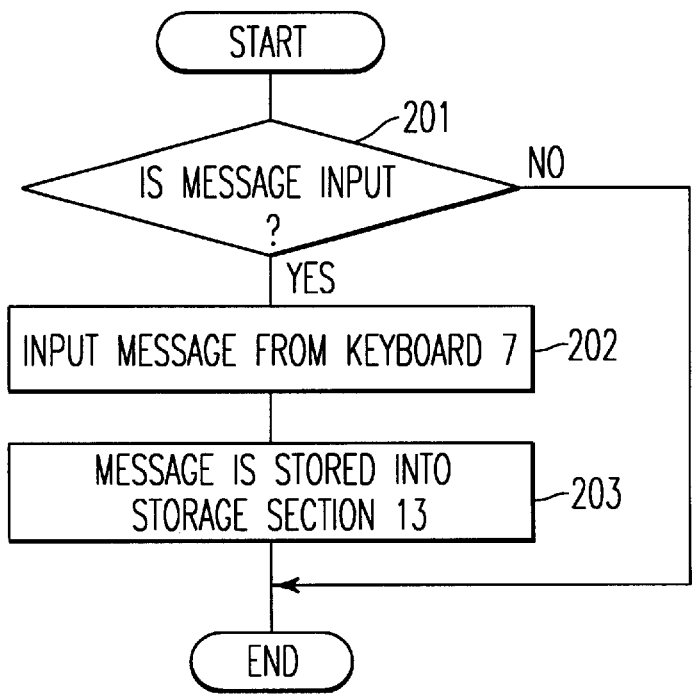
FIG. 2 is a flowchart showing the processing according to the first embodiment.

FIG. 2 is a flowchart showing the processing for allowing the operator to input his/her own desired messages. When the operator inputs a message (step 201), the operator calls up a menu screen using the keyboard 7 or the like in a state in which the screen saver is operating, and selects from the menu screen a mode for inputting messages. subsequently, the operator inputs messages by using the keyboard 7 or the like (step 202). For example, when the operator wants to display his/her friend's birthday, the operator first selects a "Happy Birthday" from preset messages, and then inputs the name ("Mari Yamazaki") and birthday ("Jan. 15, 1970") of his/her friend.

The preset messages have been recorded on the CD-ROM 17 in advance. The preset messages include "Happy Birthday," "Happy anniversary," "Happy Holiday," "Memory," "Thank you," "Merry Christmas," and the like.

Upon completion of the above-described message input, the messages are stored in the storage section 13 (step 203).

FIG. 3 shows the contents of message data 31 stored in the storage section 13. The message data 31 is composed of date data 33 and messages 35. As shown in FIG. 3, the messages 35 are registered such that they are paired with the corresponding date data 33. A plurality of the messages 35 may be registered for the date data 33 of a single day. For example, for February 11, a message "Genius is one percent inspiration and ninety-nine percent perspiration. Thomas Edison" which has previously been recorded on the CD-ROM 17 is registered, and the message "Happy Birthday! Mari Yamazaki" is also registered through the processing shown in FIG. 2. The messages previously recorded on the CD-ROM 17 include sayings by celebrities and other persons who were born on the corresponding date, and sayings of persons made on specific days, such as "The earth was blue."

The operation for actually starting the screen saver will be described with reference to FIGS. 4–10. When the screen saver is to be started, the operator designates, on the menu screen displayed on the display unit 5, whether a calendar is to be displayed (step 401). When the calendar is not required to be displayed, an ordinary graphic image and a message are displayed on the display unit 5 in a manner which changes with elapse of time (step 402).

Figure 5:
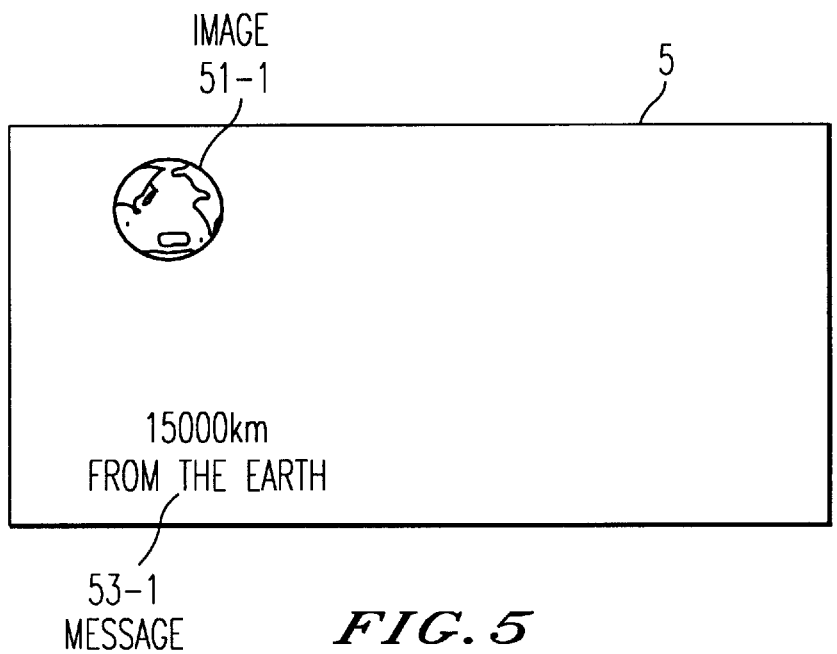
FIGS. 5–10 are diagrams each showing the contents of display on the display unit in the first embodiment.
Figure 6:
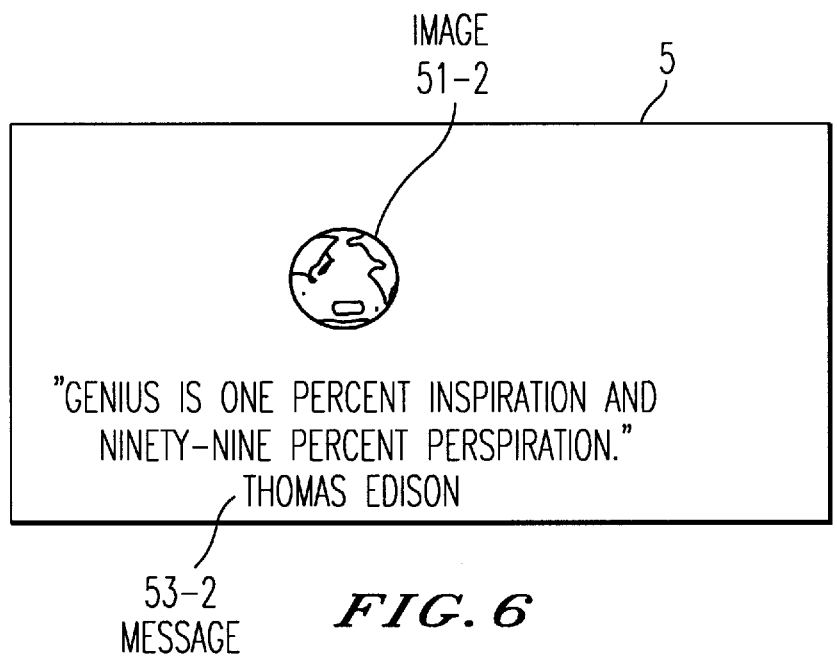

For example, it is assumed that the personal computer 1 is operated on Feb. 11, 1996. In this case, a graphic image 51-1 of the earth, and a message 53-1 are displayed on the display unit 5, as shown in FIG. 5. The message 53-1 informs the operator of the distance from the earth. Subsequently, when a period of, for example, about 5 seconds has elapsed, a graphic image 51-2 of the earth is displayed differently from the graphic image 51-1 in terms of size and display position. Further, a message 53-2 different from the message 53-1 is displayed. In detail, since the personal computer 1 is operated on Feb. 11, 1996, the message "Genius is one percent inspiration . . . " is selected from the message data 31 and is displayed.

Figure 7:
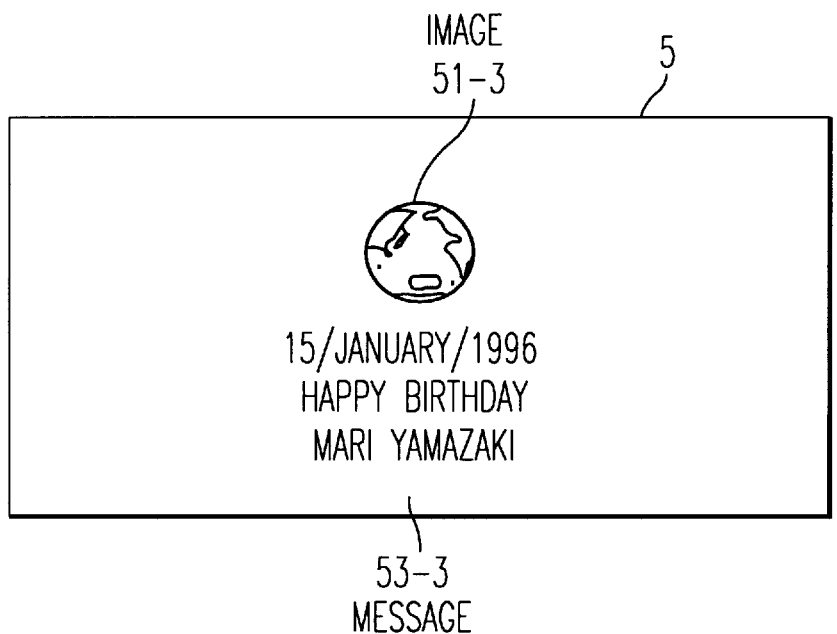

When another period of 5 seconds has passed, a graphic image 51-3 of the earth and a message 53-3 are displayed on the display unit 5, as shown in FIG. 7. The graphic image 51-3 of the earth is displayed differently from the graphic image 51-2 shown in FIG. 6 in terms of size and display position. The message 53-3 differs from the message 53-2. The message 53-3 was arbitrarily set by the operator, and the birthday of a friend or the operator's own wedding anniversary is displayed in accordance with the message set by the operator. Therefore, it is possible to perform setting so as to display such a message not only on the corresponding date but also during a period of about one week before that date, thereby preventing the operator from missing his/her friend's birthday or the like. The number of days for advance display of the message can be set on the menu screen.

The above-described operation is repeated, so that the image and message displayed on the display unit 5 are changed with elapse of time. That is, the screen shown in FIG. 6 is again displayed after the screen shown in FIG. 7 is displayed.

Figure 4:
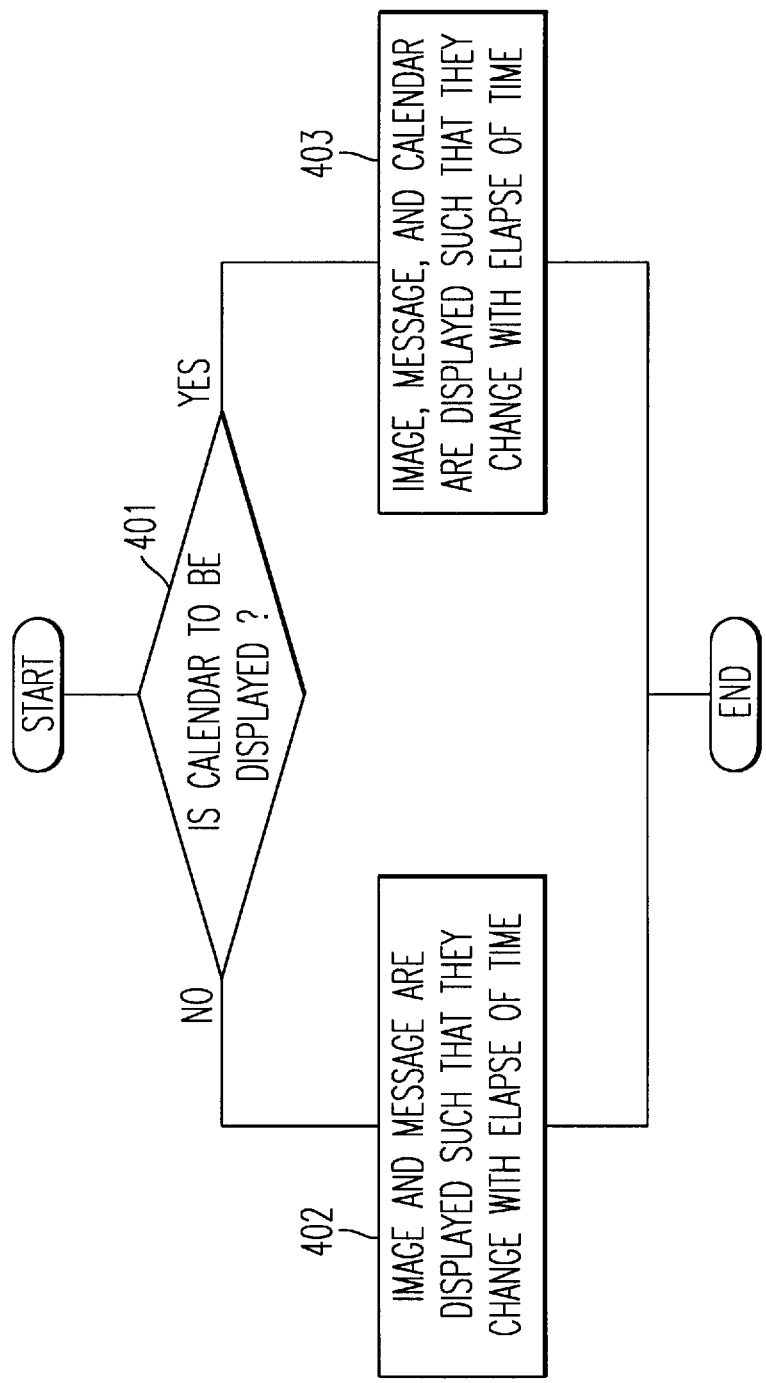
FIG. 4 is a flowchart showing the processing according to the first embodiment.

When a mode for displaying a calendar is selected in step 401 shown in FIG. 4, a graphic image, a message, and a calendar are displayed such that they change with elapse of time (step 403).

Figure 8:
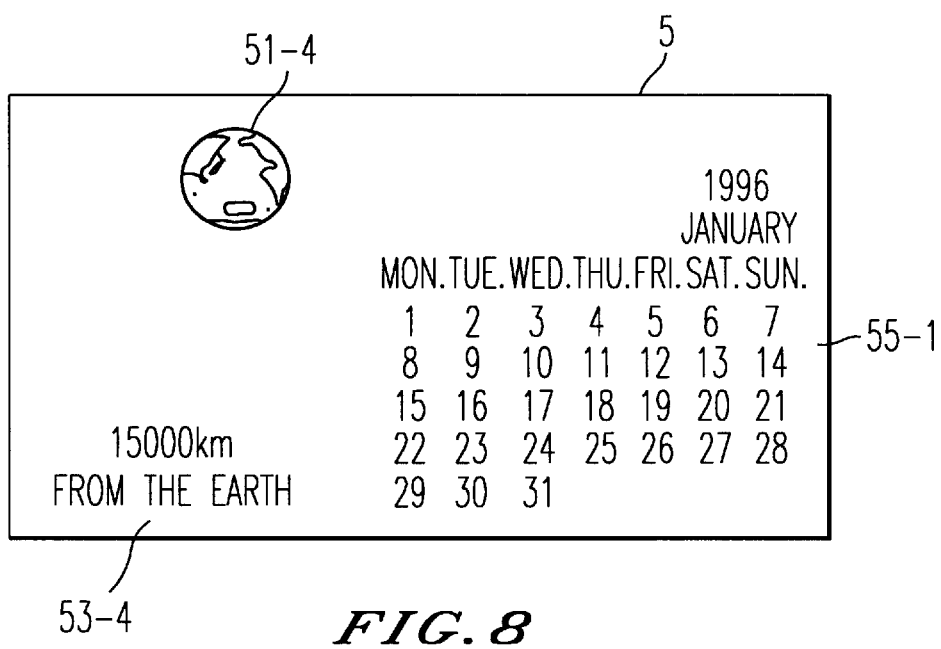
Figure 9:
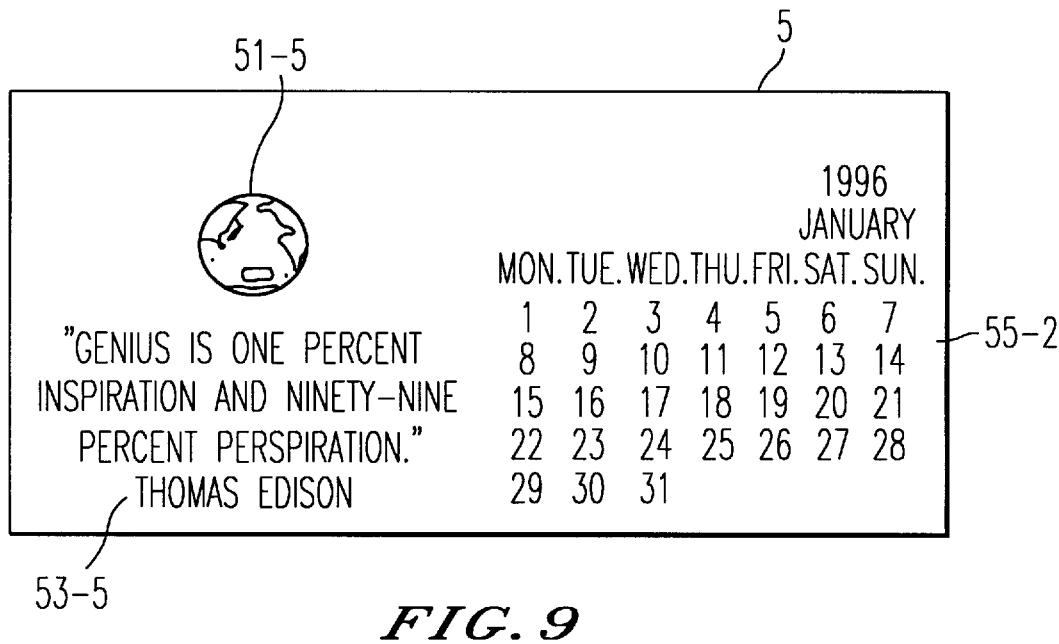

For example, it is assumed that the personal computer 1 is operated on Feb. 11, 1996. In this case, a graphic image 51-4 of the earth, a message 53-4, and an image 55-1 of a calendar are displayed on the display unit 5, as shown in FIG. 8. The calendar is for a month in which the personal computer 1 is operated. Subsequently, when a period of, for example, about 5 seconds has elapsed, a graphic image 51-5 of the earth, a message 53-5, and an image 55-2 of the calendar are displayed, as shown in FIG. 9. The graphic image 51-5 of the earth is displayed differently from the original graphic image 51-4 of the earth in terms of size and display position. The message 53-5 differs from the message 53-4.

Figure 10:
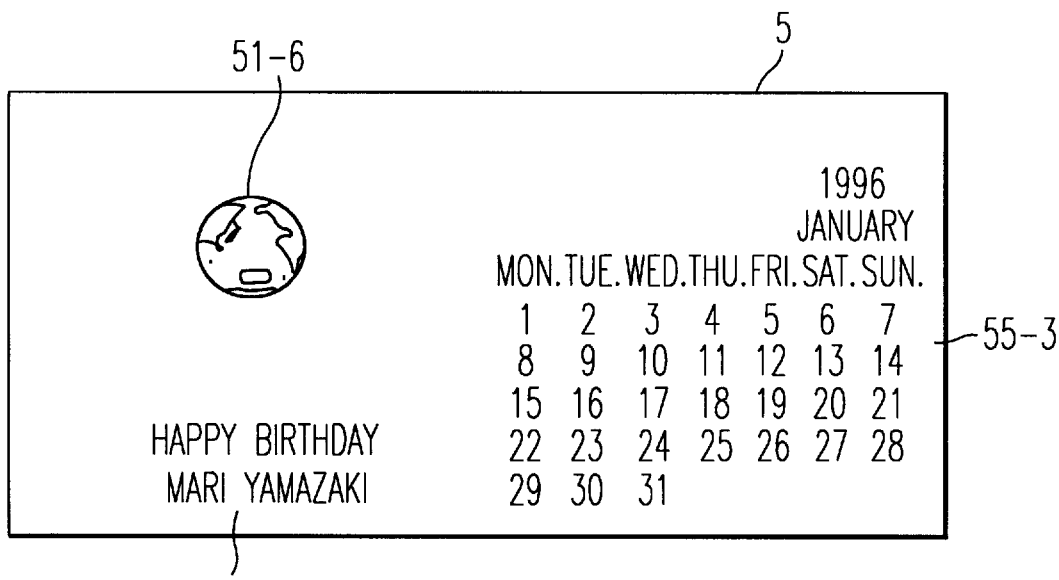

When another period of 5 seconds has elapsed, a graphic image 51-6 of the earth, a message 53-6, and an image 55-3 of the calendar are displayed, as shown in FIG. 10. The graphic image 51-6 of the earth is displayed differently from the graphic image 51-5 of the earth shown in FIG. 9 in terms of size and display position. The message 53-6 differs from the message 53-5.

The above-described operation is repeated, so that the image and message displayed on the display unit 5 are changed with elapse of time. That is, the screen shown in FIG. 9 is again displayed after the screen shown in FIG. 10 is displayed. Although the display position of the image 55 of the calendar is constant in FIGS. 8–10, the image 55 of the calendar is repeatedly displayed and erased, so that burning of the display unit 5 can be prevented.

In the above-described first embodiment, since a calendar can be displayed in addition to an ordinary image which is provided by an ordinary screen saver, the image display apparatus of the present embodiment is practical. Further, since sayings by celebrities and other persons who were born on the same date as the date on which the personal computer 1 is operated can be displayed, it is possible to prevent the operator from losing his/her interest. Moreover, since the operator is allowed to arbitrarily create some of the messages, he or she can register messages for his/her friend's birthday or for his/her own wedding anniversary. This makes it possible to start the display of a message regarding the birthday or the like about one week before the actual birthday or the like, thereby preventing the operator from missing his/her friend's birthday or the like.

Next, a description will be given of a second embodiment. In this second embodiment, a graphic image of a picture or the like and a calendar are displayed on the display unit 5 such that they change with elapse of time and such that sound corresponding to the image is output. That is, image data, a calendar, sound data, and the like are recorded on the CD-ROM 17.

Figure 11:
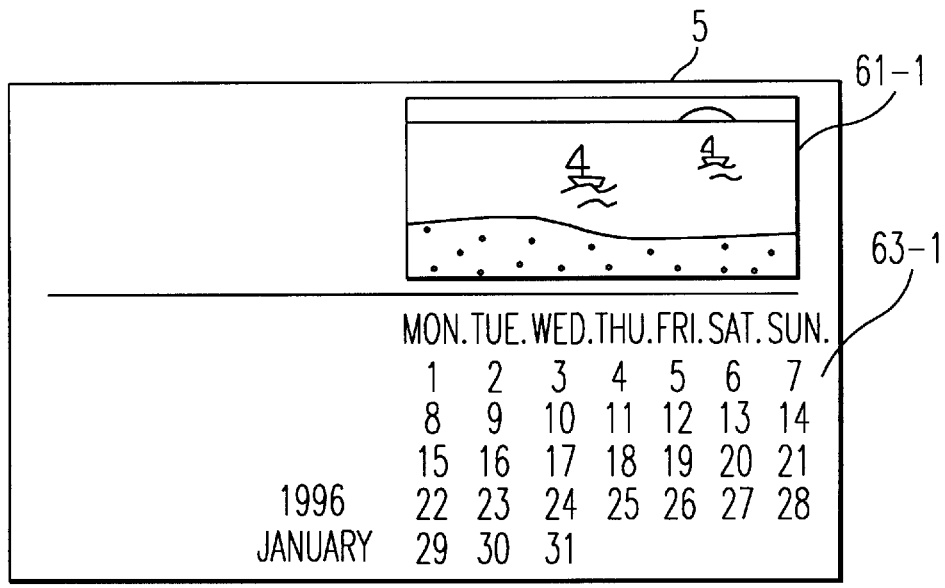
FIGS. 11–13 are diagrams each showing the contents of display on the display unit in a second embodiment of the present invention.

FIG. 11 shows the contents of display on the display unit 5 when the screen saver according to the second embodiment is operated. In the present embodiment, when the screen saver is started up, a graphic image 61-1 and an image 63-1 of a calendar are displayed, as shown in FIG. 11. The calendar is for a month in which the personal computer 1 is operated. The graphic image 61-1 is an image of a yacht, and when this image is displayed, a sound of waves is generated from the personal computer 1.

Figure 12:
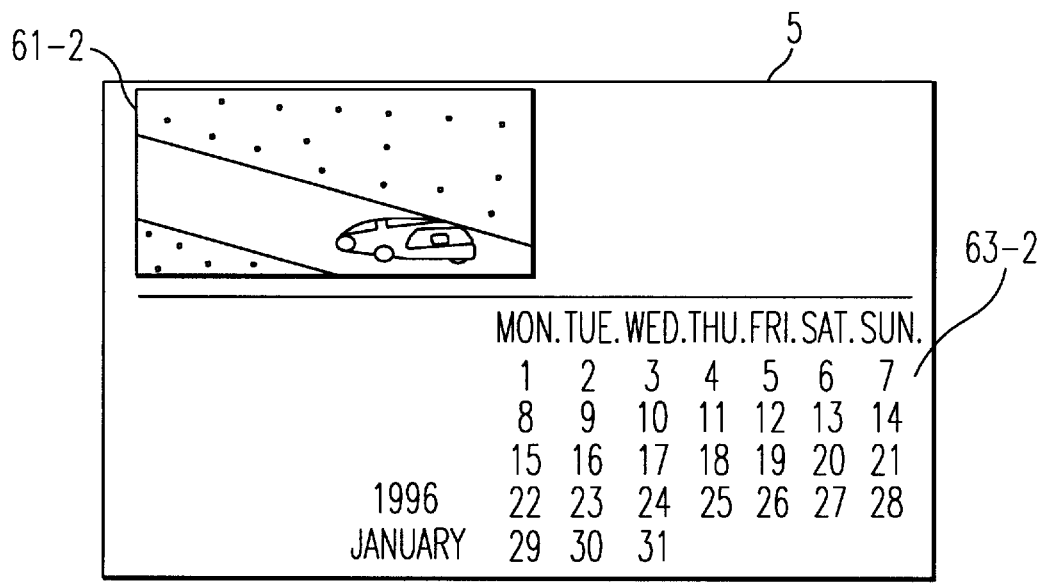

When a period of, for example, about 5 seconds has elapsed after the screen shown in FIG. 11 was displayed, the contents of display on the display unit 5 are erased, and a graphic image 61-2 and an image 63-2 of the calendar shown in FIG. 12 are displayed. In FIG. 12, the graphic image 61-2 is an image of a car (racing car). When this graphic image is displayed, a sound produced by the car is generated from the personal computer 1.

Figure 13:
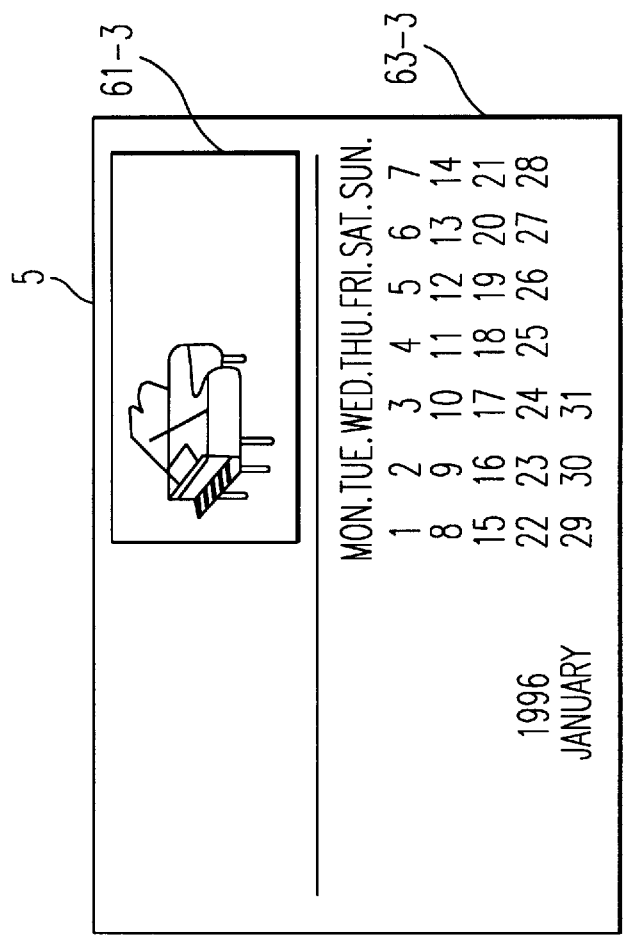

When another period of, for example, about 5 seconds has elapsed after the screen shown in FIG. 12 was displayed, the contents of display on the display unit 5 are erased, and a graphic image 61-3 and an image 63-3 of the calendar shown in FIG. 13 are displayed. In FIG. 13, the graphic image 61-3 is an image of a piano. When this graphic image is displayed, a sound produced by the piano is generated from the personal computer 1. The above-described operation is repeatedly performed, so that the graphic images and the calendar are displayed with sound such that they change with elapse of time.

In addition to the images recorded on the CD-ROM 17, pictures taken by the operator and the like can be used for the graphic image 61.

In this second embodiment as well, messages can be displayed as in the first embodiment. Further, messages created by the operator can be displayed.

As described above, according to the present invention, it is possible to provide a practical image display apparatus which can prevent the operator from losing his/her interesting in looking at the display.

What is claimed is:

1. An image display apparatus for displaying an image on a display unit as a screen saver, comprising:

a memory for storing messages corresponding to a date;

means for reading a message for each date from the memory; and means for displaying the different messages every day on a computer screen as a screen saver.

2. An image display apparatus according to claim 1, wherein the messages are created by an operator.

3. A recording medium on which a program for performing the functions described in claim 1 is recorded.

4. An image display apparatus for displaying an image on a display unit as a screen saver comprising:

a memory, wherein:

the memory includes means for storing messages set by an operator corresponding to a date; and the memory includes means for storing a predetermined time period set by an operator for displaying messages;

message reading means for reading a message set by an operator from the memory;

time period reading means for reading a predetermined time period set by an operator from the memory; and means for displaying a message which has been read by the message reading means on a computer screen as a screen saver for a predetermined time period set by the operator which has been read by the time period reading means.

* * * * *